United States Patent [19]

Jann

[11] Patent Number: 5,719,840
[45] Date of Patent: Feb. 17, 1998

[54] OPTICAL SENSOR WITH AN ELLIPTICAL ILLUMINATION SPOT

[75] Inventor: Peter C. Jann, Santa Clara, Calif.

[73] Assignee: Phase Metrics, San Diego, Calif.

[21] Appl. No.: 777,490

[22] Filed: Dec. 30, 1996

[51] Int. Cl.[6] ........................................ G11B 7/00
[52] U.S. Cl. ........................................ 369/58; 369/112
[58] Field of Search ........................ 369/112, 58, 44.32, 369/116, 44.25, 54

[56] References Cited

U.S. PATENT DOCUMENTS

| | | | |
|---|---|---|---|
| 4,935,811 | 6/1990 | Tsuchihashi et al. | 369/58 |
| 5,339,300 | 8/1994 | Akatsuka et al. | 369/44.32 |
| 5,568,454 | 10/1996 | Shima et al. | 369/44.32 |

*Primary Examiner*—Nabil Hindi
*Attorney, Agent, or Firm*—Blakely Sokoloff Taylor & Zafman

[57] ABSTRACT

An optical sensor which provides a focused elliptical illumination spot. The instrument includes a light source which provides a light beam that is directed through a cylindrical lens. The cylindrical lens focuses the light beam normally on a disk surface as an elliptical illumination spot with a major axis along a tracking direction and a minor axis along a scanning direction. Light scattered by the disk is then detected by a detector and processed to detect defects on the disk surface.

11 Claims, 2 Drawing Sheets

OPTICAL SENSOR WITH AN ELLIPTICAL ILLUMINATION SPOT

BACKGROUND OF THE INVENTION

1. Field of the Invention

The present invention relates to the field of defect detection in disk storage systems, and more particularly, to an optical sensor for scanning a disk with a focused elliptical illumination spot.

2. Description of the Related Art

There is a significant quality control problem associated with surface imperfections on magnetic disks. This typically occurs, for example, on nickel-plated aluminum substrates used in the manufacture of thin-film magnetic media, but may be a problem with respect to any area where a smooth surface is desired. Typical surface defects include pits, dirt, dust, oil, stains, fingerprints and the like. Defects on the surface of rigid magnetic media are often a result of an impingement onto the surface or a tearing of material away from the surface. Quality control of such magnetic disks is typically maintained by inspecting the disks using defect detection systems.

Existing defect detection systems include interferometers in which light of a specific wavelength is focused as a round illumination spot on a disk. The illumination is reflected from the disk and then interfered with a reference beam to produce an interference pattern. Although interferometers can readily detect large surface defects, they cannot easily detect small surface defects. To increase the sensitivity of such interferometric systems, the size of the illumination spot which is focused on the surface is typically decreased. This however, increases the time required to inspect the surface. It also results in the use of a focus servo to keep the illumination spot in focus. Such small illumination spots are also generally formed with large numerical apertures which produce little depth-of-focus.

Thus, there is a need in the magnetic disk drive industry for an optical inspection instrument which is capable of scanning a disk surface with both high efficiency and sensitivity so that very small defects on the surfaces of polished magnetic disk substrates may be detected with a high throughput. The optical inspection instrument should provide a focused illumination spot without the use of a focus servo.

BRIEF SUMMARY OF THE INVENTION

An optical sensor which provides a focused elliptical illumination spot. The instrument includes a light source which provides a light beam that is directed through a cylindrical lens. The cylindrical lens focuses the light beam normally on a disk surface as an elliptical illumination spot with its major axis parallel to the tracking direction and its minor axis parallel to the scanning direction. Light scattered by the disk surface is then detected by a detector and processed to detect defects on the disk surface.

DETAILED DESCRIPTION OF THE PREFERRED EMBODIMENT

A surface inspection apparatus and method is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
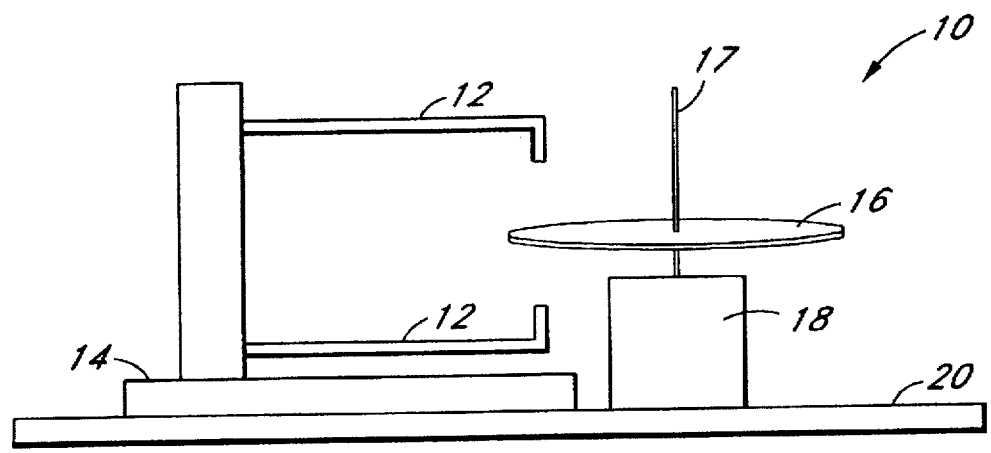
FIG. 1 illustrates a system for inspecting disk surfaces in accordance with the teachings of the present invention.

As shown in FIG. 1, the surface inspection apparatus or system of the present invention, generally illustrated at 10, comprises dual sensors 12 mounted on a carriage 14 and situated in relation to a magnetic disk substrate 16 such that one sensor monitors a first surface of the disk 16 while the other sensor monitors of a second surface of the disk 16. The magnetic disk substrate 16 is rotated about an axis 17 by a spindle motor 18 during operation of the inspection apparatus. The carriage 14 is preferably movable along a track 20 so that the inspection apparatus of the present invention can be used to produce a scan of an entire disk. Each of the sensors 12 may be capable of distinguishing bumps, pits and scratches from surface contamination and quantitatively characterizing the geometry of the former while providing information regarding their location on the medium being examined. The sensors 12 and carriage 14 may be a product or a modified product marketed by Phase Metrics, Inc. of San Diego, Calif.

The magnetic disk substrate which is being inspected may be held by a vacuum chuck and rotated by the air bearing spindle 18. Two diametrically opposed non-contact optical sensors may be simultaneously radially translated over each of the disk surfaces by the carriage 14, thereby producing spiral shaped inspection scans of both surfaces of the disk. These scans consist of adjacent tracks which may or may not overlap depending upon the throughput and precision required of the tool.

Figure 2:
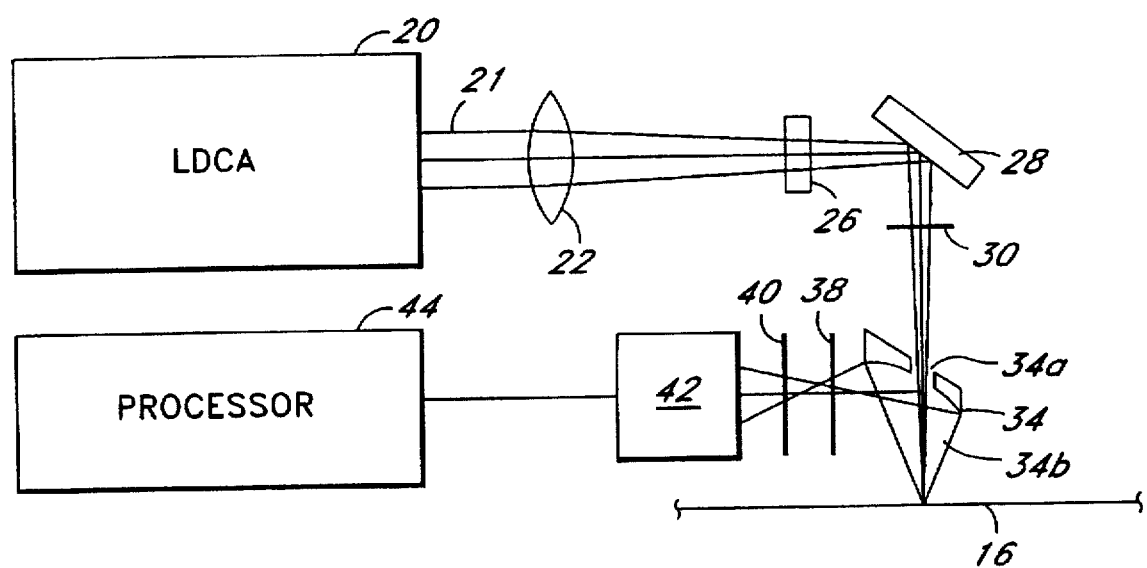
FIG. 2 illustrates one embodiment of the optical sensor of the present invention.

Reference is now made to FIG. 2. Since the two sensors 12 shown in FIG. 1 are substantially the same, only one will be shown to avoid unnecessary duplication. It is to be understood that two or more sensors may be employed. The sensor 12 includes a laser diode collimator assembly (LDCA) 20, a high-index plano-convex lens 24, a cylindrical lens 26, a flat mirror 28, a quarter wave plate 30, a spherical mirror 34 with a hole 34a and a reflective surface 34b. The sensor 22 also includes an opaque slit 38, a polarizer 40 which improves the signal-to-background-noise ratio of the system 10 and a detector 42. In one embodiment, the detector 42 is a photomultiplier tube (PMT). In another embodiment, the detector 42 is an avalanche photodiode (APD), with a dynamic range which is larger than that of a PMT. A processor 44 is coupled to the detector 42 and used to process the signals provided by the detector 42 to determine the presence of defects on the disk 16.

The sensor assembly 12 operates as follows. The collimated output beam 21 of the LDCA 20 propagates along an optical path which includes: the high-index plano-convex lens 24, the cylindrical lens 26, the flat mirror 28, the quarter wave plate 30, and through the hole 34a of the spherical mirror 34. The output beam 21 is brought to a focus on the surface of the magnetic disk surface 16 to form an illumination spot 52. In particular, the output beam 21 is brought to a focus as an "elliptical" spot by the cylindrical lens 26 which is anamorphic and has refractive power only along one axis. In one embodiment, the cylindrical lens 26 focuses the output beam 21 as an elliptical illumination spot with a large aspect ratio and a Gaussian intensity distribution onto the disk 16. An example of such a cylindrical lens 26 is that manufactured by Melles Griot under the part designation 01 LCP137/078.

Figure 3A:
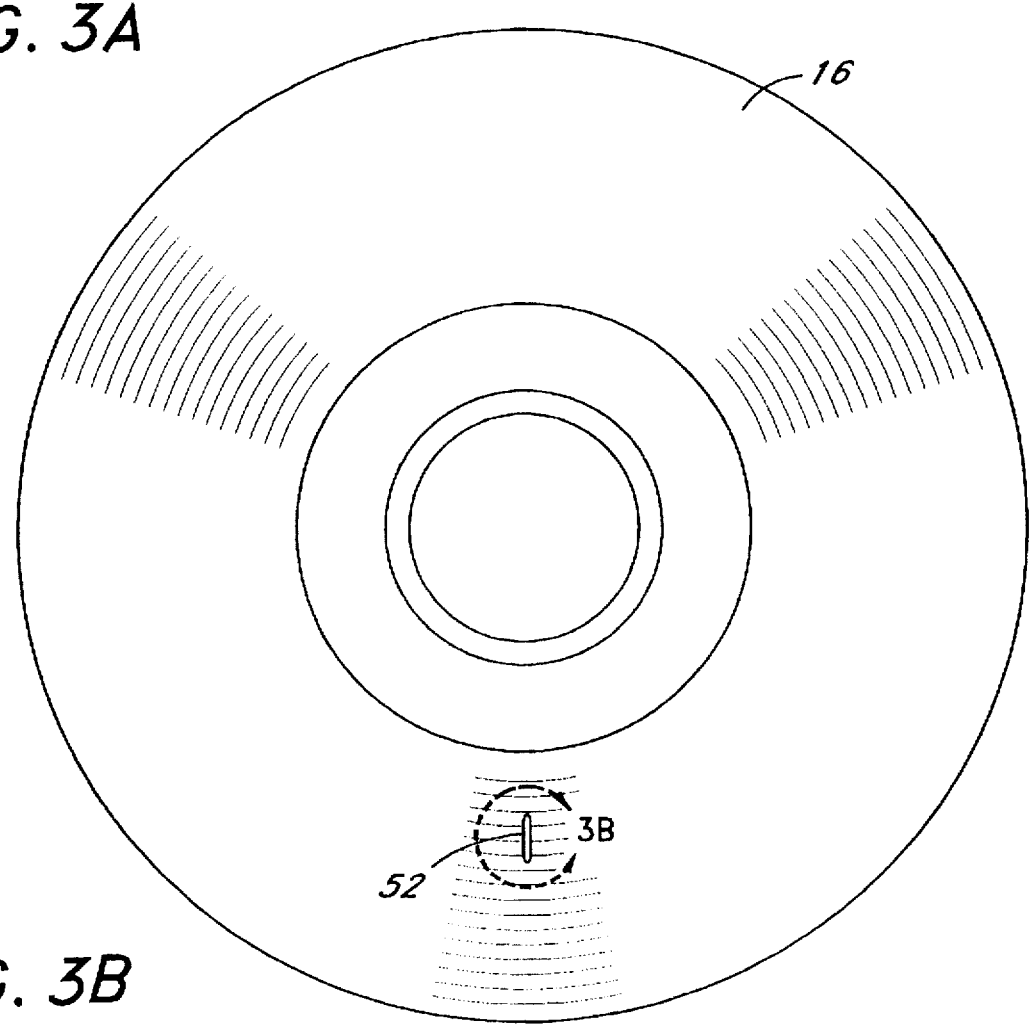
FIG. 3A illustrates the elliptical illumination spot provided by the optical sensor of FIG. 2, as focused on a disk.
Figure 3B:
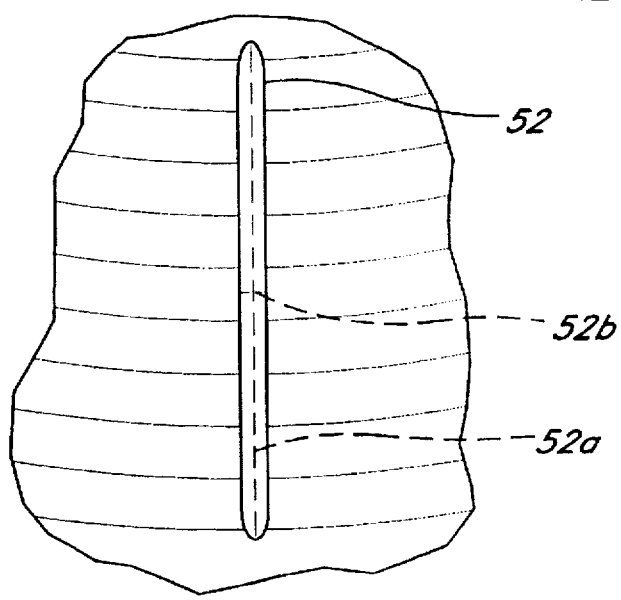
FIG. 3B is an enlarged view of the elliptical illumination spot taken along lines 3B—3B of FIG. 3A.

As shown in FIGS. 3A and 3B, the disk illumination spot 52 has a major axis 52a along the tracking direction and a minor axis 52b along the scanning direction of the system 10. In one embodiment, the length of the spot 52 along its major axis 52a is approximately 420 micro-meters (µm) and the width of the spot 52 along its minor axis 52b is approximately 12 µm. In addition, the disk illumination spot 52 has a numerical aperture (NA) of 0.030 in the major axis 52a and a NA of 0.035 in the minor axis 52b. The output beam 21 preferably has a wavelength of 670 nm and is normally incident upon the surface of the disk 16. The dimensions of the illumination spot 52 and its small numerical apertures preclude the need for a focus servo subsystem to accommodate any disk axial run-out, while the laser diode collimator assembly 20 includes an output power servo circuit to stabilize the assembly's output.

By projecting an elliptical illumination spot 52 with a large aspect ratio, the elliptical illumination spot 52 may be considered as a diffraction-limited focused "line" of illumination. This permits high system throughput, with high sensitivity to small asperities on the disk surface 16 by the system 10. In the preferred embodiment, the major axis dimension of 420 µm along the tracking axis provides the high throughput and the minor axis dimension of 12 µm along the scanning axis provides the high sensitivity.

As the surface of the magnetic disk surface 16 moves through the focused illumination spot 52, light that is scattered into the darkfield region propagates along an optical path which includes: the reflective portion 34b of the spherical mirror 34, the opaque slit 38, the polarizer 40 and the detector 42. The darkfield region is only illuminated when small asperities on disk surface 16 pass through the illumination spot 52. Light which is scattered by these asperities into the darkfield region is collected by detector 42. The detected light produces current pulses with amplitudes which are proportional to the detected light power. The amplitudes of these pulses may then be processed by processor 44 using signal processing techniques as known in the art to provide estimates of the scatter cross-section of the asperities.

By using the optical sensor of the present invention, an elliptical illumination spot may be utilized in a disk inspection system. Such a disk inspection system not only provides high sensitivity due to a small spot width along the scanning axis, but also high throughput due to a large spot length along the tracking axis, therefore permitting a large track pitch. The small illumination spot's NA also provides a large depth-of-focus which eliminates the need for a complex focus servo. This in turn permits spinning the disk at very large angular velocities, such as 10,000–15,000 revolutions per minute with conventional air bearing spindles. A disk inspection system having an elliptical illumination spot 52 (with dimensions of 12×420 µm in a preferred embodiment) in accordance with the teachings of the present invention will permit the reliable detection of sub-micron sized asperities on disk surface 16 with scan times of only about a second. With efficient signal processing, a 95 mm outer diameter disk having track widths of 210 µm, and spinning at 10,000 revolutions per minute, can be inspected in 1.0 s. A carriage 14 velocity of 35.0 mm/s would be required.

The apparatus and method of the present invention may be embodied in other specific runs without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for detecting defects on a disk surface, comprising:

a light source that generates a beam of light;

a cylindrical lens for focusing the light beam as an elliptical illumination spot onto the disk surface;

a detector for detecting light scattered from the disk surface, the detector generating a signal representative of the reflected light; and a processor coupled to the detector that determines the presence of a defect based on the signal.

2. The apparatus of claim 1, wherein the elliptical illumination spot has a length along a tracking direction and a width along a scanning direction.

3. The apparatus of claim 2, wherein the length is approximately 420 m and the width is approximately 12 µm.

4. The apparatus of claim 1, further comprising a reflector located between the cylindrical lens and the disk, that reflects light emanating from the cylindrical lens onto the disk.

5. The apparatus of claim 1, further comprising a mirror that has an opening and a reflective surface, the mirror being located between the cylindrical lens and the disk, wherein light emanating from the cylindrical lens is directed towards the disk through the opening of the mirror, and light scattered from the disk is reflected from the reflective surface of the mirror onto the detector.

6. The apparatus of claim 1, wherein the detector is a photomultiplier tube or an avalanche photodiode.

7. The apparatus for claim 1, wherein the detector is an avalanche photodiode.

8. A method for detecting defects on a surface, comprising the steps of:

(a) focusing light emanating from a light source as an elliptical illumination spot onto the surface;

(b) detecting light scattered from the surface and generating a signal representative of the scattered light; and (c) processing the signal to determine the presence of a defect on the surface.

9. The method of claim 8, wherein in step (a), a length of the elliptical illumination spot is approximately 420 µm and a width of the elliptical illumination spot is approximately 12 µm.

10. The method of claim 8, further comprising the step of reflecting light emanating from the cylindrical lens onto the disk.

11. The method of claim 8, further comprising the step of providing a mirror that has an opening and a reflective surface, wherein the mirror is located between the cylindrical lens and the disk, and wherein light emanating from the cylindrical lens is directed towards the disk through the opening of the mirror, and light scattered from the disk is reflected from the reflective surface of the mirror onto the detector.

* * * * *